United States Patent [19]
Diernaz

[11] Patent Number: 5,513,686
[45] Date of Patent: May 7, 1996

[54] TIRE BEAD STRUCTURE FOR HEAVY VEHICLES

[75] Inventor: Christian Diernaz, Riom, France

[73] Assignee: Compagnie Generale des Establissments Michelin-Michelin & Cie, Clermont-Ferrand, France

[21] Appl. No.: 272,781

[22] Filed: Jul. 8, 1994

[30] Foreign Application Priority Data

Jul. 12, 1993 [FR] France .................................. 93 08662

[51] Int. Cl.$^6$ ............................................... B60C 15/00
[52] U.S. Cl. ........................ 152/540; 152/454; 152/539; 152/544; 152/545; 152/553
[58] Field of Search ................................ 152/545, 454, 152/543, 546, 544, 540, 539, 553, 551, 552

[56] References Cited

U.S. PATENT DOCUMENTS

| | | |
|---|---|---|
| 1,822,320 | 9/1931 | Shoemaker . |
| 2,186,178 | 1/1940 | Shoemaker ............................. 152/545 |
| 2,817,381 | 12/1957 | Powers . |
| 4,061,172 | 12/1977 | Yoshida et al. .......................... 152/546 |
| 4,365,659 | 12/1982 | Yoshida et al. .......................... 152/545 |
| 4,554,960 | 11/1985 | Pompier . |
| 4,700,765 | 10/1987 | Masclaux ............................... 152/545 |
| 5,323,830 | 6/1994 | Diernaz ................................ 152/545 |

FOREIGN PATENT DOCUMENTS

| | | |
|---|---|---|
| 323165 | 2/1903 | France . |
| 1195309 | 11/1959 | France . |
| 1005862 | 4/1957 | Germany . |
| 2361975 | 6/1975 | Germany . |
| 3141877 | 12/1982 | Germany . |

*Primary Examiner*—Geoffrey L. Knable
*Attorney, Agent, or Firm*—Brumbaugh, Graves, Donohue & Raymond

[57] ABSTRACT

A tire structure with radial carcass reinforcement for heavy vehicles and particularly a tire bead structure which makes it possible to have, on unmodified rims, sidewalls the radii of curvature of which are sufficiently great to avoid premature fatigue of the constituent reinforcement elements of the carcass as a result of the flexing cycles generated by travel. The said tire structure has at least one bead wire (2) which is located radially to the outside of the rim flange (J) and around which the turn-up (1') of the carcass (1) is formed.

13 Claims, 2 Drawing Sheets

5,513,686

TIRE BEAD STRUCTURE FOR HEAVY VEHICLES

BACKGROUND OF THE INVENTION

The present invention relates to tires for heavy vehicles, such as trucks and buses. More particularly, it relates to the beads of radial carcass tires which have at least one bead wire in each bead and are intended to be mounted on rims defined in accordance with the existing standards and having flanges axially on the outside.

In certain cases, tires for heavy vehicles are called upon to support substantial overloads which produce flexings at the level of the side walls of the tire of an amplitude which is greater, and therefore more disadvantageous, the greater the overload. This problem is also encountered in the case of twin tires when one of the two tires has suffered a loss of pressure, as the result, for instance, of a puncture, and the other tire, which bears the entire load, experiences at its sidewalls flexings which are very disadvantageous for the life of the carcass reinforcement.

Finally, for certain heavy vehicles there is a demand for tires the overall diameter of which is substantially reduced while they retain the profiles and dimensions of rims at present on the market in order to increase the useful load transported; if H represents the height of the tire mounted on its rim, measured on a meridian section between the point of the bead closest to the axis of rotation and the outermost point of the tread of the tire and S the overall width of the tire measured parallel to the axis of rotation, the aspect ratio is defined by H/S.

In the case of aspect ratios less than or equal to 0.6, poor resistance to fatigue of the tire under the cycles imposed by travel is noted; in each side wall of the tire extending between a bead and the belt of the crown, the corresponding portion of the radial carcass is reduced in height and, therefore, each carcass cord undergoes cycles of flexure along small radii of curvature. In operation, upon each revolution of the wheel these cords are subjected to cycles of variation in curvature which are more disadvantageous the smaller this aspect ratio and therefore these radii of curvature.

Various proposals are known which are directed at overcoming excessive fatigue in the sidewall of a tire during the course of travel. Among them, mention may be made of French Patent No. 1,502,689 which discloses that by reinforcing this zone of the tire with, for instance, a layer of rubber stock, the tire is imparted additional rigidity and it is thus possible to decrease the amplitude of the flexing cycles. However, such an arrangement results in an increase in weight and particularly in heating of the sidewalls and therefore in a consumption of energy.

Another proposal disclosed in French Patent Application No. 2,415,016 suggests producing a "depression" in the sidewall of the tire, thus making it possible to reduce the height of the bead and increase the height of the sidewall and therefore to increase the flexibility of the sidewall. This solution makes it possible effectively to increase the life of the sidewalls under strong flexure, but in a manner which is still limited in part due to the fact that the zone of the bead of the tire which is furthest radially to the outside is still forced to flex along the profile of the flange of the rim.

While these two proposals make it possible substantially to increase the life of the sidewall, they still are insufficient in the case of tires of ratios less than or equal to 0.6.

SUMMARY OF THE INVENTION

The object of the present invention is to produce a radial carcass tire mounted on a rim having bead seats which are extended radially and axially to the outside by flanges and the sidewalls of which tire have in inflated state radii of curvature which are substantially greater than those obtained on a tire of the same dimensions made in accordance with the prior art.

Another object is in this way to obtain longer life under the loading cycles caused by travel and under static or dynamic overloads.

The object of the present invention described with reference to the accompanying drawings is a tire for heavy vehicles which is intended to be mounted on a rim J having two bead seats which are extended axially and radially towards the outside by flanges of radius $R_J$, each bead B comprising at least one bead wire 2 of inner radius $R_T$ around which a radial carcass armature is anchored by turning-up, characterized by the fact that (a) the center of gravity 21 of the meridian section of the bead wire 2 is located radially to the outside of the rim flange, (b) the bead wire 2 has a modulus of elasticity at least equal to 100,000 MPa and its clamping on the rim flange $s=(R_J-R_B)/(R_T-R_B)$ is between 0.1 and 0.9, $R_B$ being the radius of the bead of the unmounted tire measured in the plane perpendicular to the axis of rotation and passing through the center of gravity 21 of the cross section of the bead wire 2.

By located radially to the outside of the rim flange, it is to be understood that the center of gravity 21 is located at a distance from the axis of rotation greater than $R_J$ and is positioned on a straight line perpendicular to the axis of rotation passing between the point K, the point of connection between the generatrix of the seat of the rim and the flange of the rim, and the point L, point of the furthest axially outward point of the flange of the rim.

In the present invention, in the case of the tire mounted on its rim and inflated to its operating pressure and subjected to its average load of use, the axial component of the forces exerted by the bead on the rim flange resulting from the effects of the inflation pressure and the lateral stresses imposed on the tire along a curve is balanced, for instance, by frictional forces and wedging forces developed between the bead and the rim flange. Adaptation of these forces can be effected by adjusting the value of the clamping of the bead wire 2 and the position of its center of gravity 21 radially to the outside of the rim flange and axially with respect to this same rim flange.

In this position of the bead wire spaced both radially to the outside and axially to the outside with respect to its traditional position, the radius of curvature of the radial reinforcements of the carcass ply is increased, which improves the resistance to fatigue of said reinforcements.

This effect on the radius of curvature of the sidewalls can be further improved if the turn-up of the carcass ply around the bead wire 2 is effected radially towards the inside of the tire.

One advantage of the present invention is the possibility of retaining the rims at present available and in particular of retaining the same diameters of the brake-drum on which the assembly consisting of tire and rim is mounted.

The present invention permits a possible decrease in the outside diameter of the tire in order to obtain a tire having an aspect ratio which is less than or equal to 0.6 with a small section height H while having sidewalls the radii of curvature of which are sufficiently great and assuring a suitable locking of the beads on the rim.

In order to improve, in time, the holding of the tire on the rim with due consideration of the phenomena of flow of the rubber mixes located radially below the bead wire 2, it is advantageous for the portion of the bead B axially to the inside with respect to the bead wire 2 to be extended radially towards the inside by means of an extension 5; said extension may even come into contact with the seat of the rim.

In order to maintain, over the course of time, a force of contact between the portion 5 of the bead B and the rim seat, this extension may be reinforced by various materials, such as, for instance, textile or metal cords arranged annularly or at least a bead wire of any cross section.

In order to assure an effective holding of the bead on the rim even under the effect of thermal stresses generated by the heating of the brake drums as a result of repeated braking, it may be advantageous, while reinforcing the portion 5 of the bead B axially and radially to the inside with respect to the bead wire 2 with, for instance, a bead wire 3 of a modulus of at least 4000 MPa, to arrange one or more connecting plies between the bead wire 3 and the portion of the bead radially to the outside of the flange of the rim.

The role of this ply is to avoid any danger of axial displacement towards the outside of the portion of the bead radially to the outside of the rim flange under the effect of thermal and mechanical stresses.

The cords or cables of each connecting ply are directed in such a manner as to form an angle of between −45° and +45° with respect to the orientation of the carcass reinforcement.

The description which follows, read with reference to the accompanying drawing which shows possible embodiments and is given solely by way of example, will permit of a better understanding of the invention.

DETAILED DESCRIPTION OF PREFERRED EMBODIMENTS

Figure 1:
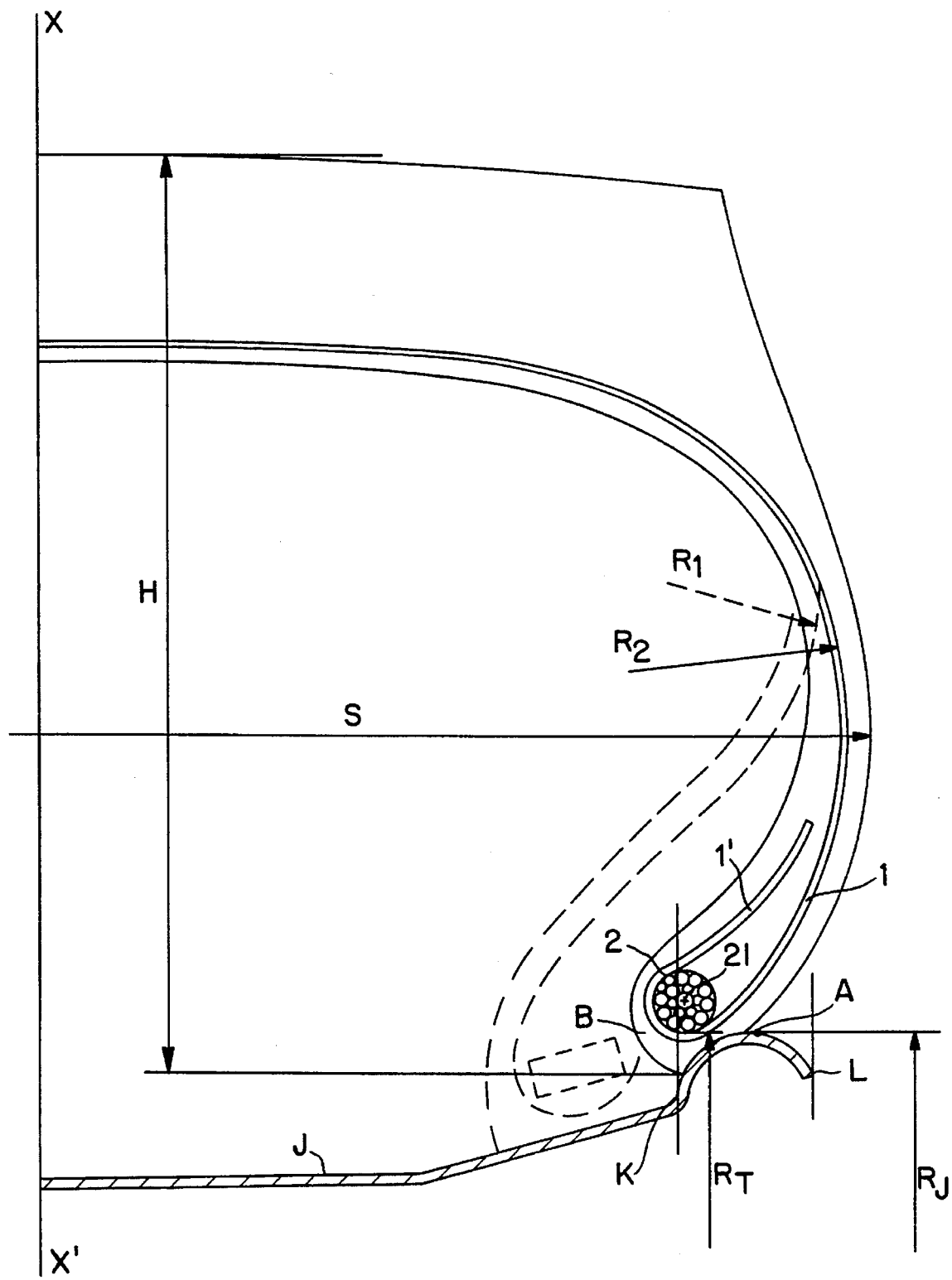
FIG. 1 is a view of the transverse half-section of a tire mounted on its rim in accordance with the invention, the axis XX' being the axis of symmetry of the figure.

FIG. 1 shows, in solid lines, the meridian half section of a tire of size 295/50 R 22.5 developed in accordance with the invention, and superimposed on that, drawn in dashed lines, a tire of the same size in accordance with the prior art, these two tires being mounted on the same rim. In this example, the mounting rim J comprises two bead seats, the generatrices of which form an angle of 15°±1° with a line parallel to the axis of rotation, said seats being extended radially and axially towards the outside by flanges in the form of a circular arc of radius 12.7 mm; for said mounting rim the radius $R_J$ corresponds to the radial distance between the axis of rotation and a point A of the flange furthest away from the axis of rotation. The point K is the point of connection between the rim seat and the rim flange and the point L is the point of the rim flange furthest axially to the outside.

The tire developed in accordance with the invention comprises a bead wire of "braided" type of interior radius $R_T$, the center of gravity 21 of the section of which is located radially with respect to the axis of rotation at a distance greater than the radius $R_J$ of the rim flange and is positioned axially on a straight line perpendicular to the axis of rotation passing between the point K and the point A of the rim flange furthest radially to the outside. A carcass reinforcement 1 of metal cables formed of 12 wires of 18/100 is turned up axially towards the inside around the bead wire 2 to form the turn-up 1', this making it possible to avoid the presence of a point of inflection of the carcass reinforcement above the bead wire 2 and thus to increase the height of the sidewall and therefore the radius of curvature of the sidewall of the inflated tire.

The bead wire 2 of "braided" type has a modulus of elasticity extension equal to 150,000 MPa and its clamping $s=(R_J-R_B)/(R_T-R_B)$ is equal to 0.3 in order to assure the locking of the bead on the rim flange, $R_B$ (see FIG. 2) being the radius of the bead of the tire not mounted on the rim measured in the plane which is perpendicular to the axis of rotation and passes through the center of gravity of the cross section of the bead wire 2.

It will be noted that, while having a tire the aspect ratio H/S of which is in this case equal to 0.5, it has been able to retain for the sidewall of the 295/50 R 22.5 tire an average radius of curvature $R_2$ of the carcass reinforcement which is greater than the average radius $R_1$ measured on the sidewall of the tire constructed with a bead in accordance with the prior art.

Figure 2:
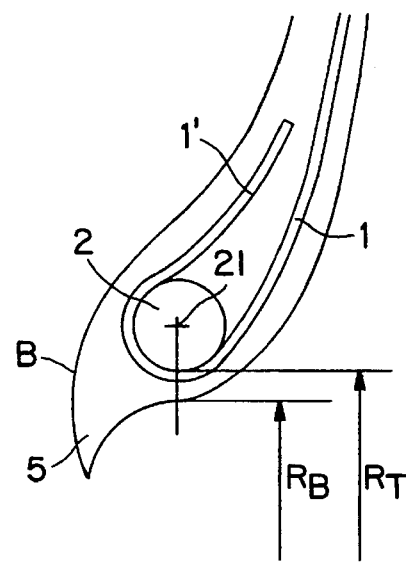
FIG. 2 is a meridian view of a tire bead, not mounted on a rim, in accordance with the invention.

FIG. 2 shows the bead B of a tire developed in accordance with the invention, not mounted on a rim; this bead comprises a carcass ply 1 which is turned up axially towards the inside around a bead wire of "braided" type, positioned in the bead B in such a manner that, once the tire is mounted on the rim, the center of gravity 21 of the cross section of the bead wire 2 is located radially to the outside of the flange of the rim and axially between the two straight lines perpendicular to the axis of rotation and passing through the points K and A. The said bead also comprises a portion 5 of rubber mix which is axially towards the inside with respect to the bead wire 2 and which extends the bead B radially towards the axis of rotation in contact with a portion of the rim flange.

Figure 3:
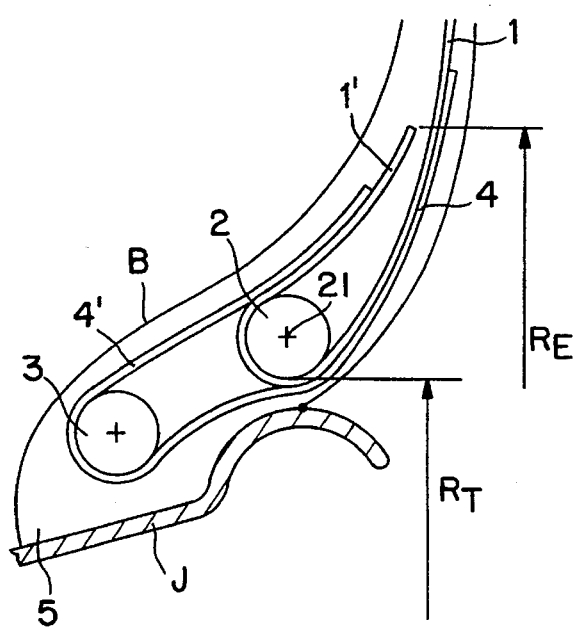
FIG. 3 is a variant embodiment of the invention in which the portion of the bead furthest axially and radially to the inside comprises a reinforcement bead wire around which there is wound a connecting ply the ends of which are located on opposite sides of the bead wire which is located radially to the outside of the rim flange.

FIG. 3 shows a variant of the invention in which the bead B is extended radially towards the axis of rotation by a portion 5 axially and radially to the inside with respect to the bead wire 2 which is itself positioned radially to the outside of the flange of the rim J; the said portion 5 comes into contact with the seat of the rim J and is reinforced by a bead wire 3 of "braided" type of a modulus equal to 100,000 MPa. Around this bead wire 3 there is wound a connecting ply formed of textile cords, the turn-ups 4 and 4' of which cover, on the two sides, the carcass reinforcement 1 and its turn-up 1'. The end of the turn-up 4' is located at a distance from the axis of rotation greater than the inner radius $R_T$ of the bead wire 2 and less than the radius $R_E$ of the end of the turn-up 1' of the carcass reinforcement; the end of the turn-up 4 is located at a distance from the axis of rotation greater than the radius of the end of the turn-up 1' of the carcass reinforcement. The cords of this connecting ply are disposed radially.

Figure 4:
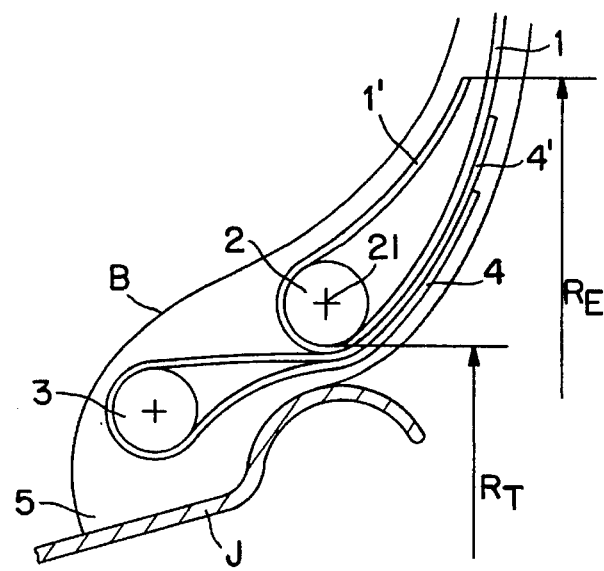
FIG. 4 is another variant embodiment of the invention in which the two ends of a connecting ply are arranged on the same side with respect to the bead wire which is located radially to the outside of the flange of the rim.

FIG. 4 shows another tire bead developed in accordance with the invention and mounted on a rim in which the portion 5 of the bead B axially and radially to the inside with respect to the bead wire 2 is extended until coming into contact with the seat of the rim J and comprises a bead wire 3 of "braided" type of a modulus equal to 100,000 MPa, around which there is wound a connecting ply of radially arranged textile cords, the turn-ups 4 and 4' of which are in part superimposed and are both located on the side axially to the outside of the carcass reinforcement. The ends of the turn-ups of the connecting ply are located, with respect to the axis of rotation, at distances greater than the inside radius $R_T$ of the bead wire 2 and less than the radius $R_E$ of the end of the turn-up 1' of the carcass reinforcement. In order to avoid a discontinuity in resistance to flexure of the zone of the bead located radially to the outside of the bead wire 2, the ends of the turn-ups of the connecting ply are staggered with a minimum stagger of 10 mm between their respective radii.

It should be noted that in the variant tire bead structures shown in FIGS. 3 and 4, the development of the clamping on the flange as a function of time is better controlled due to the fact that a part of the rubber stocks is replaced by at least one ply of a non-flowing material.

I claim:

1. A tire for heavy vehicles mounted on a standard rim having two bead seats which are extended axially and radially towards the outside by convexly curved flanges of maximum radius $R_J$ from the axis of rotation, said tire comprising beads, at least one bead wire of inner radius $R_T$ within each bead and a radial carcass reinforcement extending around the same bead wire and anchoring the bead wire by a turn-up, characterized by the fact that (a) the center of gravity of a meridian section of the bead wire is located radially to the outside of the rim flange and axially to the inside with respect to the point of the rim flange of maximum radius, (b) the bead wire has a modulus of elasticity at least equal to 100,000 MPa and its clamping on the rim flange $s=(R_J-R_B)/(R_T-R_B)$ is between 0.1 and 0.9, $R_B$ being the radius of the bead of the unmounted tire measured in the plane perpendicular to the axis of rotation and passing through the center of gravity of the cross section of the bead wire.

2. A tire mounted on a rim according to claim 1, in which the carcass reinforcement is turned up axially towards the inside around the bead wire.

3. A tire mounted on a rim according to claim 1, in which the bead includes a portion axially to the inside of the bead wire which portion is extended radially towards the axis of rotation in order to be able to come into contact with a portion of the flange of the rim.

4. A tire mounted on a rim according to claim 3, in which the portion of the bead which is axially to the inside with respect to the bead wire is extended radially until it can come into contact with the seat of the rim.

5. A tire mounted on a rim according to claim 4, in which the portion of the bead which is axially and radially to the inside with respect to the bead wire includes a reinforcement element having a modulus of elasticity which is at least equal to 4000 MPa.

6. A tire mounted on a rim according to claim 5, in which the reinforcement element is a braided bead wire of circular cross section.

7. A tire mounted on a rim according to claim 6, including at least one connecting ply wound around the bead wire reinforcing element which ply forms two turn-ups arranged axially to the inside of the carcass turn-up and axially to the outside of the carcass, respectively, the said turn-ups having ends the radii of which are greater than the radius $R_T$ of the bead wire.

8. A tire mounted on a rim according to claim 7, in which the connecting ply or plies are formed of textile or metal cords or cables arranged in such a manner as to form an angle of between 0° and 45° with respect to the orientation of the carcass reinforcement.

9. A tire mounted on a rim according to claim 6, including at least one connecting ply wound around the bead wire reinforcement element which ply forms two turn-ups, the said turn-ups being in part superimposed and disposed axially to the outside of the carcass and having ends the radii of which are greater than the radius $R_T$ of the bead wire.

10. A tire mounted on a rim according to claim 9, in which the connecting ply or plies are formed of textile or metal cords or cables arranged in such a manner as to form an angle of between 0° and 45° with respect to the orientation of the carcass reinforcement.

11. A tire mounted on a rim according to claim 6, including at least one connecting ply between a part of the bead located above the rim flange and the braided wire.

12. A tire mounted on a rim according to claim 1, characterized by the fact that the doped ratio H/S of said tire is at most equal to 0.6.

13. A tire mounted on a rim according to claim 1 in which the reinforcement includes metal cables all of which extend around the same bead wire.

* * * * *

UNITED STATES PATENT AND TRADEMARK OFFICE
CERTIFICATE OF CORRECTION

PATENT NO. : 5,513,686
DATED : May 7, 1996
INVENTOR(S) : Diernaz

It is certified that error appears in the above-indentified patent and that said Letters Patent is hereby corrected as shown below:

Col. 1, line 67, "ratios" should read --aspect ratios--.

Col. 2, line 37, "point" should read --the point--.

Col. 3, line 9, "the seat" should read --the generatrix of the seat--.

Col. 4, line 22, "elasticity extension" should read --elasticity--.

Col. 6, line 44, "doped" should read --aspect--.

Signed and Sealed this

Fifteenth Day of October, 1996

Attest:

BRUCE LEHMAN

Attesting Officer   Commissioner of Patents and Trademarks